Figure 1:
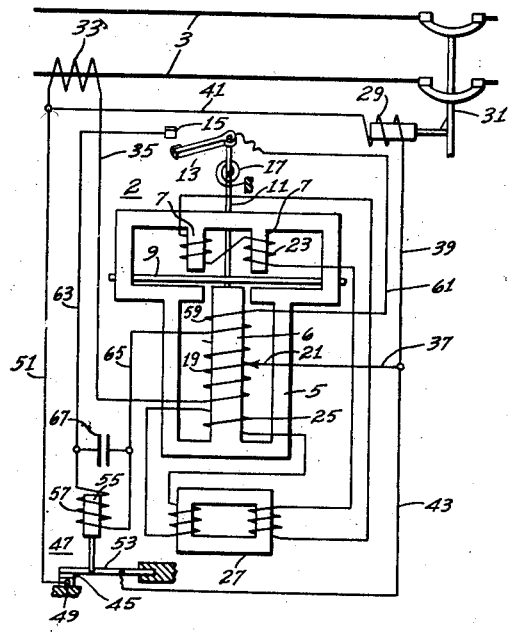

Nov. 2, 1943.  H. J. CARLIN ET AL  2,333,520
ELECTRICAL PROTECTIVE RELAY SYSTEM
Filed Jan. 9, 1942

WITNESSES:
C. J. Weller.
C. L. Freedman.

INVENTORS
Herbert J. Carlin & Leslie N. Crichton,
deceased, by Ruth M. Crichton, Administratrix.
BY
ATTORNEY Patented Nov. 2, 1943

2,333,520

UNITED STATES PATENT OFFICE 2,333,520

ELECTRICAL PROTECTIVE RELAY SYSTEM

Herbert J. Carlin, East Orange, N. J., and Leslie N. Crichton, deceased, late of Livingston, N. J., by Ruth M. Crichton, administratrix, Livingston, N. J., assignors to Westinghouse Electric & Manufacturing Company, East Pittsburgh, Pa., a corporation of Pennsylvania Application January 9, 1942, Serial No. 426,258

7 Claims. (Cl. 175—294)

This invention relates to electrical relay systems, and it has particular relation to relay systems of the type wherein an electrical relay and relay controlled apparatus are connected for energization from a common source of electrical energy.

In the relay art, it is conventional practice to connect a relay and relay controlled apparatus to a common source of electrical energy. As a specific example, reference may be made to an overcurrent relay which is employed for controlling the tripping solenoid of a circuit breaker. Such an overcurrent relay may be energized from the secondary winding of a current transformer. When the current output of the current transformer rises above a predetermined value, the relay is actuated to place the tripping solenoid in condition for receiving energy in series with the overcurrent relay from the secondary winding of the same current transformer. Under these conditions, the current transformer may be unable to carry the added burden without a substantial drop in current output thereof. The drop in current output of the transformer may be sufficient to permit opening of the relay contacts and the resulting discontinuation of the energization of the tripping solenoid. Since the tripping solenoid no longer receives energy from the current transformer, the output of the current transformer again rises to actuate the overcurrent relay. Actuation of the overcurrent relay again places the tripping solenoid in condition to receive energy from the secondary winding of the current transformer in series with the relay. This cycle of operation may repeat for a long period to produce what is known as a "pumping" operation of the overcurrent relay.

In accordance with the invention, a relay system of the type discussed in the preceding paragraph is modified to increase the efficiency or effectiveness of the relay in response to actuation thereof. Because of this increase in efficiency or effectiveness, the reduced output of the current transformer following the energization of the tripping solenoid is sufficient to retain the relay in actuated condition. Consequently, pumping of the relay is prevented and tripping of the associated circuit breaker is assured.

It is, therefore, an object of the invention to provide an improved electrical relay system of the type wherein a relay and relay control apparatus are connected for energization from a common source of electrical energy.

It is a further object of the invention to provide an electrical relay system of the type wherein a relay and relay controlled apparatus are connected for energization from a common source of electrical energy with means for increasing the effectiveness or efficiency of the relay following an actuation thereof.

Figure 2:
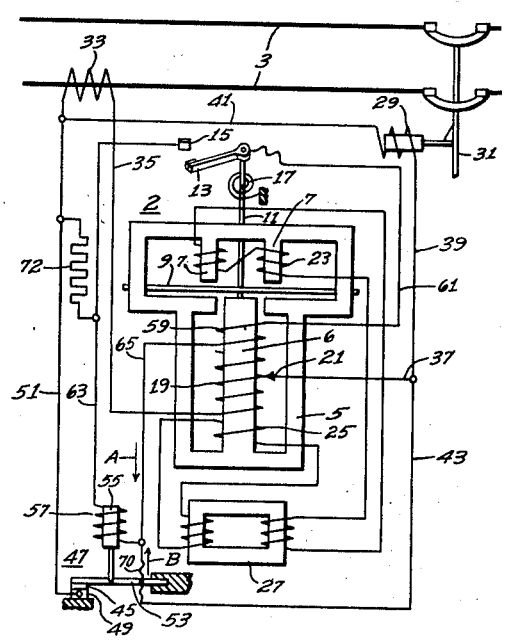
Figure 3:
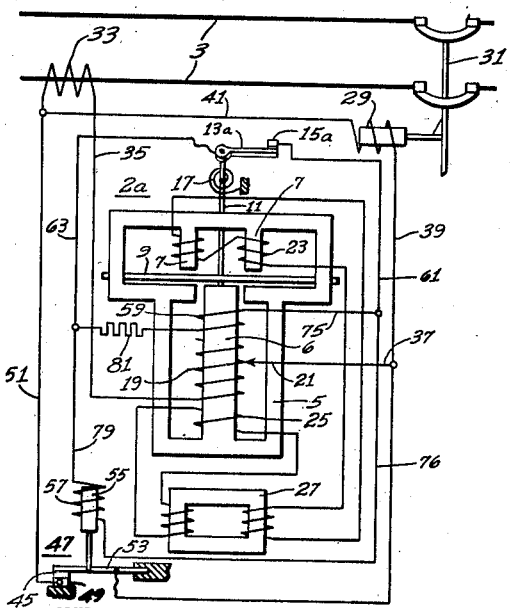
Figure 4:
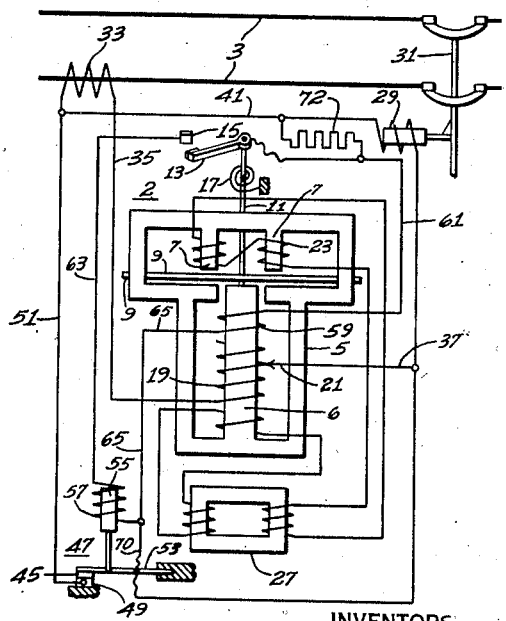

Other objects of the invention will be apparent from the following description taken in conjunction with the accompanying drawing, in which:

Figure 1 is a schematic view of an electrical relay system embodying the invention; and Figs. 2, 3 and 4 are schematic views showing modifications of the relay system illustrated in Fig. 1.

Referring to the drawing, Fig. 1 shows a relay system including a relay 2 associated with an electrical circuit 3 to be protected. The electrical circuit 3 may vary appreciably in construction and operation. The circuit 3 may be a single-phase or poly-phase circuit and may be designed for operation at various frequencies. For the purpose of this discussion, it is assumed that the circuit 3 is a single-phase alternating-current circuit operating at a frequency of 60 cycles per second.

The relay 2 may vary appreciably in construction. For the purpose of illustration, the relay 2 includes an electromagnet of generally conventional construction. This electromagnet includes a magnetic core 5 having a main pole 6 and auxiliary poles 7 which are spaced to define an air gap. An electro-conductive armature in the form of a disc 9, is positioned in the air gap for rotation relative to the poles. The armature 9 is carried by a shaft 11 which is mounted for rotation in bearings (not shown). Rotation of the shaft 11 is employed for carrying a movable contact 13 into and out of engagement with a fixed contact 15. Normally, the movable contact 13 is biased out of engagement with the fixed contact 15 by means of a control spring 17.

For actuating the relay 2 an energizing winding 19 is associated with the main pole 6 for producing magnetic flux therein. An adjustable tap 21 may be associated with the energizing winding 19 to vary the effective turns thereof. Auxiliary windings 23 are associated with the auxiliary pole 7. These windings 23 are energized from the energizing winding 19 through a coupling winding 25 which is inductively coupled to the energizing winding 19. The coupling winding 25 is connected to the auxiliary windings 23 through a transformer 27 which conventionally is termed a torque compensator.

The construction and operation of the relay 2 as thus far described are well understood in the art. When the energizing winding 19 is energized by alternating current, a shifting magnetic field is established in the air gap between the main pole 6 and the auxiliary pole 7. When the torque applied to the armature 9 by this shifting magnetic field becomes sufficient to overcome the bias of the control spring 17, the movable contact 13 is actuated into engagement with the fixed contact 15.

Actuation of the movable contact 13 into engagement with the fixed contact 15 is employed to control any desired translating means, such as the tripping solenoid 29 of a circuit breaker 31. In the specific embodiment of Fig. 1, the circuit breaker 31 is employed to control the connection of the circuit 3 to an adjacent circuit or adjacent apparatus.

As previously indicated, it is desirable in some cases to connect the energizing winding 19 and the tripping solenoid 29 for energization from a common source of electrical energy. To this end, the energizing winding and the tripping solenoid are connected to the secondary winding 33 of a current transformer associated with one conductor of the circuit 3. Consequently, the energizing winding 19 of the relay 2 is energized in accordance with current flowing in the circuit 3. The energizing circuit for the energizing winding 19 may be traced from one terminal of the secondary winding 33 through a conductor 35, the energizing winding 19, the adjustable tap 21, a conductor 37, a conductor 39, the tripping solenoid 29, and the conductor 41 to the remaining terminal of the secondary winding.

Under normal conditions of operation the solenoid 29 is bypassed or shunted by a circuit which maybe traced from one terminal of the tripping solenoid through the conductor 39, a conductor 43, a movable contact 45 of an auxiliary relay 47, a fixed contact 49 of the auxiliary relay 47, a conductor 51 and a conductor 41 to the remaining terminal of the tripping solenoid. Consequently, as long as the contacts 45 and 49 of the auxiliary relay 47 remain closed, the tripping solenoid 29 is deenergized. The movable contact 45 may be mounted on a leaf spring 53 which is connected to a magnetic armature or core 55 for movement therewith. The magnetic core 55 is actuated by a winding 57 to separate the contacts 45 and 49.

For energizing the winding 57 of the auxiliary relay 47, a winding 59 is inductively coupled to the energizing winding 19. As shown in Fig. 1, the winding 59 is positioned about the main pole 6. When the relay 2 operates to close its contacts 13 and 15, an energizing circuit is established for the auxiliary relay 47 which may be traced from one terminal of the winding 59 through a conductor 61, the movable contact 13, the fixed contact 15, a conductor 63, the energizing winding 57, and a conductor 65 to the remaining terminal of the winding 59.

It is believed that the operation of the relay system thus far described is apparent from the foregoing discussion. Under normal conditions of operation, the energizing winding 19 of the relay 2 is energized from the secondary winding 33 of the current transformer through a circuit which may be traced from one terminal of the secondary winding 33 through the conductor 35, the energizing winding 19, the adjustable tap 21, the conductor 37, the conductor 43, the contacts 45 and 49, and the conductor 51 to the remaining terminal of the secondary winding. When the current flowing in the circuit 3 rises to an excessive value, such that the torque applied to the armature 9 of the relay 2 is sufficient to overcome the bias of the control spring 17, the armature moves the contacts 13 and 15 into engagement. Such engagement establishes an energizing circuit for the auxiliary relay 47 to separate the contacts 45 and 49. Separation of the contacts 45 and 49 permits current to pass through the tripping solenoid 29 which is connected in series with the energizing winding 19 for energization from the secondary winding 33. Energization of the tripping solenoid 29 operates to trip the circuit breaker 31.

As previously explained, the addition of the solenoid 29 to the effective circuit energized by the secondary winding 33 may result in a substantial drop in the current output of the secondary winding. Such a drop in current output in turn may result in a pumping operation of the relay 2. Pumping of the relay 2 also may be caused by operation of the auxiliary relay 47. It will be observed that energy for the auxiliary relay is supplied from the relay 2. This tends to reduce the energy available for operating the disc 9 for each closure of the contacts 13 and 15.

According to the invention, pumping of the relay 2 under these circumstances is prevented by increasing the efficiency or effectiveness of the relay 2 in response to engagement of the contacts 13 and 15. To this end, engagement of the contacts 13 and 15 is utilized for connecting a capacitive reactance, such as a capacitor 67, across the winding 59. In the modification shown in Fig. 1, the capacitor 67 is connected between the conductors 63 and 65. It will be understood that the capacitor 67 receives a leading current from the winding 59.

The relationship between the winding 59 and the energizing winding 19 is such that these windings form, respectively, the secondary and primary windings of a transformer. The current passing through the energizing winding 19 is determined substantially by the characteristics of the current transformer 33. The effect of the leading component of current taken by the capacitor 67 is to increase the magnetizing component of the current flowing through the energizing winding 19. Since an increase in the magnetizing component increases the torque applied to the armature 9, it follows that the capacitor 67 increases the effectiveness or efficiency of the relay 2 with respect to the energization of the energizing winding 19. Inasmuch as the effectiveness or efficiency of the relay 2 is increased in response to a closure of the contacts 13 and 15, the contacts will remain closed even though the current output of the secondary windings 33 decreases substantially. Therefore, the capacitor 67 serves to eliminate a pumping action of the relay 2.

Fig. 2 shows a preferred embodiment of the invention. In Fig. 2, the relay 2, auxiliary relay 47 and the secondary winding 33 of the current transformer are associated in substantially the same manner as Fig. 1. However, the capacitor 67 of Fig. 1 is not employed.

In Fig. 2, the winding 57 of the auxiliary relay 47 is connected to receive energy conductively from the secondary winding 33 following a separation of the contacts 45 and 49. For this purpose, one terminal of the winding 57 may be connected through a suitable conductor 70 to the movable contact 45. The remaining terminal of the winding 57 may be connected through a suitable impedance such as a resistor 72 to the fixed contact 49. Except for the omission of the capacitor 67, the operation of the various parts in Fig. 1 and Fig. 2 is substantially the same and a detailed discussion of the operation of the system shown in Fig. 2 appears to be unnecessary. However, the modification in the operation of the relay introduced by the connections of the winding 57 across the contacts 45 and 49 may briefly be set forth.

When the contacts 45 and 49 separate following an engagement of the contacts 13 and 15, the energizing winding 57 receives energy not only from the winding 59 but additionally receives energy in accordance with the voltage across the tripping solenoid 29. The instantaneous directions of flow of currents supplied from these two sources are shown respectively, by the arrows A and B.

It will be observed that the directions of flow of the currents supplied to the winding 57 are such that the current represented by the arrow B assists in maintaining the contacts 45 and 49 separated after an operation of the auxiliary relay 47. Consequently, a positive retention of the relay 47 in its open condition is assured.

With respect to the winding 59, it will be observed that the currents represented by the arrows A and B flow in opposite directions. In other words, the direction of flow of the current represented by the arrow B is such as to assist in magnetizing the magnetic core 5 and results in an increase in effectiveness or efficiency of the relay 2 for any energization of the energizing winding 19. Since the current represented by the arrow B flows in such a direction as to tend to return energy to the magnetic core 5, a drop in the current output of the secondary winding 33 resulting from the energization of the tripping solenoid 29 therefrom does not result in a separation of the contacts 13 and 15.

The purpose of the resistor 72 is to prevent the establishment of a short circuit across the winding 57 when the contacts 45 and 49 are closed. The resistor 72 has a resistance value selected to permit the flow of a reasonable amount of current represented by the arrow B. At the same time, the presence of the resistor 72 permits the initial energization of the winding 57 from the winding 59.

In Fig. 3, a relay 2a is illustrated which corresponds to the relay 2 of Figs. 1 and 2. The only essential distinction between the relay 2a and the relay 2 resides in the positioning of the movable contact 13a normally to engage the fixed contact 15a. In other words, the control spring 17 normally biases the movable contact 13a in engagement with the fixed contact 15a. Energization of the energizing winding 19 of the relay 2a operates to separate the contacts 13a and 15a.

A further distinction present in the relay system illustrated in Fig. 3 resides in the connection of the auxiliary relay 47 across the winding 59. This connection may be traced from one terminal of the winding 59 through a conductor 75, a conductor 76, a winding 57, a conductor 79, and an impedance such as a resistor 81, to the remaining terminal of the winding 59.

The contacts 13a and 15a are connected in a circuit which operates under normal conditions to establish a bypass or shunt around the winding 57. This circuit may be traced readily in Fig. 3. The purpose of the impedance or resistor 81 is to restrict the current supplied by the winding 59 when the contacts 13a and 15a are in closed condition.

Since the general operation of the relay system shown in Fig. 3 will be apparent from the discussion of Figs. 1 and 2, it is believed that a discussion of the distinctions between the construction shown in Fig. 3 and those shown in Figs. 1 and 2 will suffice.

When the value of current flowing through the energizing winding 19 rises above a predetermined value, the contacts 13a and 15a separate to open the bypass or shunt circuit normally established around the winding 57. Consequently, the winding 57 is in condition to receive energy from the winding 59 and operates to open the contacts 45 and 49 of the auxiliary relay 47. Separation of the contacts 45 and 49 operates in a manner previously discussed to energize the tripping solenoid 29.

As a result of the separation of the contacts 13a and 15a, the impedance of the energizing winding 57 is effectively included in the circuit energized from the winding 59. The resulting increase in the impedance of the circuit supplied from the winding 59 results in a reduction in current flowing therethrough and the amount of energy required by the winding 59 from the main pole 6. Since the winding 59 diverts less energy from the magnetic core 5, the effectiveness or efficiency of the relay 2a for response to current flowing in the energizing winding 19 is substantially increased. For this reason, the relay 2a substantially eliminates any pumping tendency caused by a reduction in the current output of the secondary winding 33 when the tripping solenoid 29 is energized therefrom.

The modification illustrated in Fig. 4 resembles in most respects that shown in Fig. 2. The only difference between these modifications resides in the location of the resistor 72. In Fig. 4, the resistor 72 is connected between the conductors 41 and 61. This location of the resistor 72 results in a current flow through the winding 59 even when the relay contacts 13 and 15 are separated. The circuit for this current flow may be traced from one terminal of the winding 59 through the conductor 61, the resistor 72, the conductor 41, the conductor 51, the contacts 49 and 45 of the auxiliary relay 47, the conductor 70 and the conductor 65, to the remaining terminal of the winding 59. Except for this initial flow of current through the resistor 72, which resembles the initial flow of current in the system of Fig. 3, the operation of the system illustrated in Fig. 4 is substantially the same as that discussed with reference to the system illustrated in Fig. 2. For this reason, a detailed discussion of Fig. 4 appears unnecessary.

Although the invention has been described with reference to certain specific embodiments thereof, numerous modifications are possible. Therefore, the invention is to be restricted only by the appended claims as interpreted in view of the prior art.

It is claimed:

1. In an electrical relay system, electro-responsive translating means, a relay having an energizing winding, means connecting said translating means and said energizing winding for energization from a common source of electrical energy, control means operable from a condition normally rendering said translating means ineffective to a condition rendering said translating means effective for receiving energy from the source employed for energizing said energizing winding, means responsive to actuation of said relay for operating said control means to place said translating means in said effective condition, and means responsive to operation of said control means for increasing the effective energization of said relay.

2. In an electrical relay system, electro-responsive translating means, a relay having an energizing winding, means connecting said translating means and said energizing means for energization from a common source of electrical energy, control means operable from a condition normally rendering said translating means ineffective to a condition rendering said translating means effective for receiving energy from the source employed for energizing said energizing winding, current-energized means responsive to actuation of said relay for operating said control means to place said translating means in said effective condition, and means responsive to operation of said control means for directing current passing through said energizing winding into said current-energized means, whereby said current assists in maintaining said relay in actuated condition.

3. In an electrical relay system, electro-responsive translating means, a first delay having an energizing winding, means connecting said energizing winding in series with said translating means for energization from a common source of electrical energy, a second relay having contact means connected across said translating means for preventing energization of said translating means, said second relay including operating means effective when energized for controlling said contact means to permit energization of said translating means, means connecting said operating means in parallel with said translating means for receiving energy in parallel therewith when said contact means are in open condition, and means responsive to the condition of said first relay for inductively coupling said operating means to said energizing means, whereby said first relay controls the inductive transmission of energy from said energizing winding to said operating means.

4. In an electrical relay system, a first electrical relay having a first energizing winding and having first contact means responsive to the condition of said energizing winding, electrically energized translating means, a current transformer having a secondary winding, means connecting said translating means and said energizing winding in series for energization from said secondary winding, a second electrical relay having a second energizing winding and having second contact means responsive to the condition of said second energizing winding, means inductively coupling said second energizing winding to said first energizing winding for energization therefrom, said last-named means including said first contact means for controlling the energization of said second energizing winding from said first energizing winding in accordance with the energization of said first energizing winding, means connecting said second contact means across said translating means for controlling the energization thereof in accordance with the energization of said second energizing winding, and means including an element having substantial impedance connecting said second energizing winding across said translating means for additively energizing said second energizing winding, in accordance with the voltage across said translating means, said second energizing winding having an impedance substantially larger than that of said element.

5. In an electrical relay system, electro-responsive translating means, a first relay having an energizing winding for producing magnetic flux, means connecting said energizing winding and said translating means for energization from a common source of electrical energy, a second relay having contact means connected across said translating means for preventing energization of said translating means, said second relay including operating means effective when energized for controlling said contact means to permit energization of said translating means, means responsive to magnetic flux produced by said energizing winding for inductively coupling said operating means to said energizing winding, whereby said operating means is energized from said energizing winding, and capacitance means associated with said operating means for controlling the power factor of energy transmitted through said inductive coupling to increase the effective production of said magnetic flux in response to an operation of said first relay.

6. In an electrical relay system, electro-responsive translating means, a first relay having an energizing winding, means connecting said energizing winding in series with said translating means for energization from a common source of electrical energy, a second relay having contact means connected across said translating means for preventing energization of said translating means, said second relay including operating means effective when energized for controlling said contact means to permit energization of said translating means, means establishing an auxiliary circuit for receiving electrical energy from said energizing winding, and means responsive to actuation of said first relay for decreasing the amount of energy supplied by said energizing winding to said auxiliary circuit, said last-named means including means for operatively energizing said operating means from said energizing winding.

7. In an electrical relay system, electro-responsive translating means, a first relay having an energizing winding, means connecting said energizing winding in series with said translating means for energization from a common source of electrical energy, a second relay having contact means connected across said translating means for preventing energization of said translating means, said second relay including operating means effective when energized for controlling said contact means to permit energization of said translating means, an auxiliary circuit for energizing said second relay, said auxiliary circuit including an auxiliary winding inductively coupled to said energizing winding for receiving electrical energy therefrom, and means connecting said auxiliary winding to said second relay for supplying energy thereto, said first relay having normally closed contact means connected across said second relay for preventing energization thereof, said first relay being effective when properly energized to open its contact means to permit energization of said second relay.

HERBERT J. CARLIN.
RUTH M. CRICHTON,
*Administratrix of the Estate of Leslie N. Crichton, Deceased.*